…

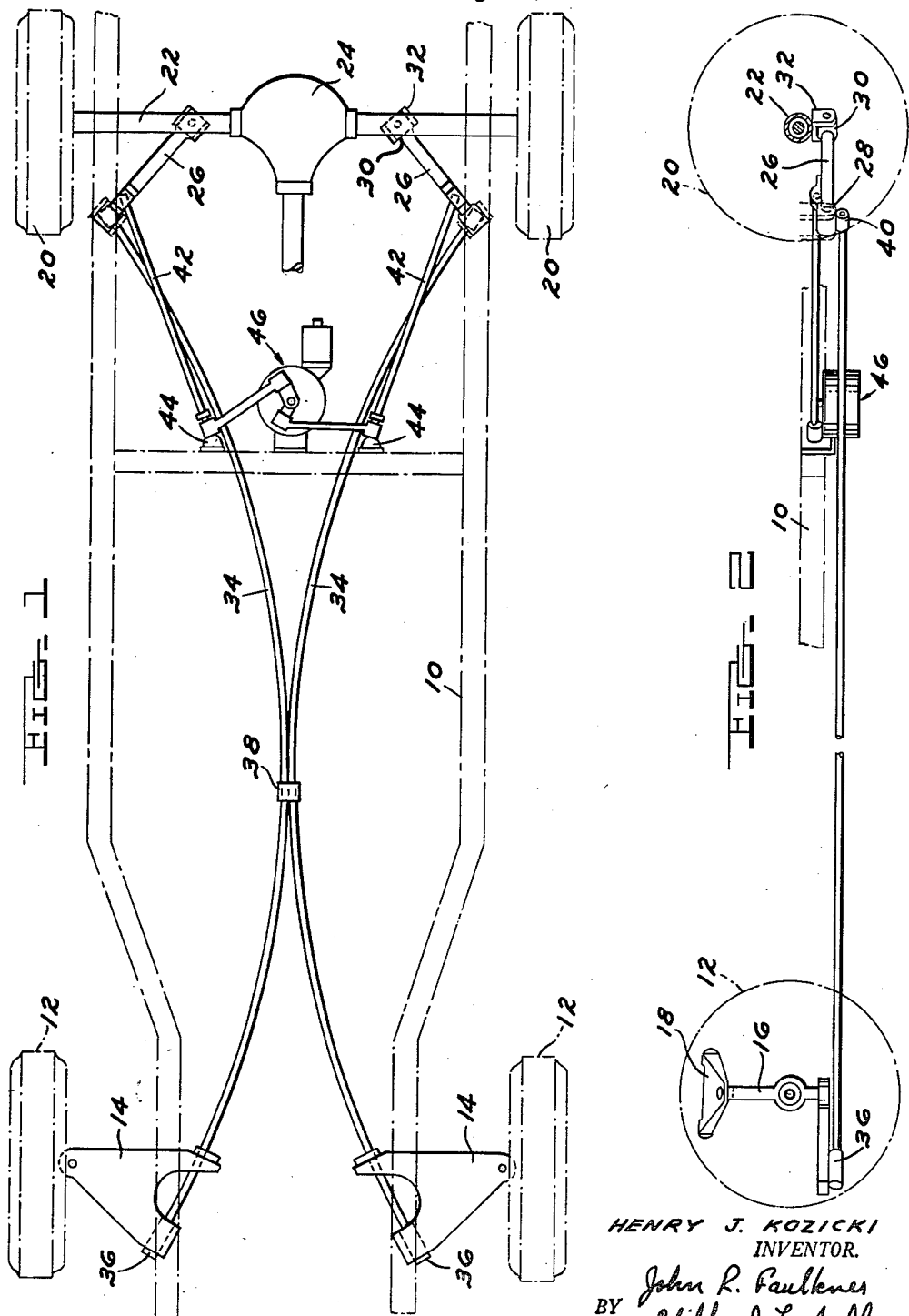

3,086,793
INTERCONNECTED TORSION BAR SUSPENSION
Henry J. Kozicki, Orchard Lake, Mich., assignor to Ford Motor Company, Dearborn, Mich., a corporation of Delaware
Filed Aug. 17, 1961, Ser. No. 132,110
2 Claims. (Cl. 280—104)

The present invention relates to vehicle suspension systems and more particularly to such systems employing full length torsion bars interconnecting the front and rear wheels.

In a conventional interconnected torsion bar suspension, the torsion bars are commonly attached to the front lower control arm and travel in a straight direction beneath the car to a rear lever arm. That lever is pivoted on frame structure such that it lies on the opposite side of the torsion bar from the front control arm. With this arrangement when both the front lower control arm and the rear lever arm are raised, the effect is to wind up the torsion bar.

The free end of the rear lever arm in such conventional constructions is attached to the rear suspension control arm by a shackle. It is a funtcion of this shackle to transfer motion from the plane of rotation of the torsion bar lever to the plane of rotation of the rear suspension control arm. These planes are at approximately 90° to one another. This shackle usually contains spherical pivots of some type to allow for the full travel of the wheels.

The complexity of the shackle needed to translate force and motion 90° results in design, development, and service problems of considerable magnitude as well as increased cost of installation. The shackle is not only expensive but is extremely difficult to design into a car having a low height where space is at a premium.

Therefore it is an object of this invention to eliminate the shackle as well as the torsion bar rear lever and the six pivots associated with these parts. In the preferred embodiment of the present invention, a curved torsion bar is provided which has a large sweep in the plan view. The curved bar is attached directly to the front lower control arm and directly to the rear control arm. The arms are placed approximately square to the end of the torsion bar. The rear suspension arm is pivoted at the frame and acts as both a suspension arm and a torsion bar lever or load arm thereby eliminating the requirements for a shackle. The free end of the arm is attached to the axle and guides the axle with the help of an upper control arm through its vertical motion.

The torsion bars being bowed approach each other in the plan view and both are attached to a common frame mounted bracket. Where the bars enter the front and rear arms any type of end connection will be appropriate such as a spline or a hexagonal connection.

The torsion bars may be either forced into the arcuate shape upon installation in a car or they may be given a permanent bend during manufacture. The bar will function in the usual manner of torsion bars. The stresses in the bar will be combined torsion and bending stress which can be accommodated satisfactorily as long as the usual maximum stress limits are observed.

The advantages and objectives of the present invention will be fully comprehended from the following discussion and the accompanying drawings in which:

FIGURE 1 is a top plan view of a vehicle chassis incorporating the present invention; and FIGURE 2 is a side elevational view of the suspension of FIGURE 1.

Referring now to the drawings wherein the presently preferred embodiment of this invention is disclosed, FIGURE 1 shows a vehicle chassis having a conventional box-shaped frame 10. Front road wheels 12 are provided and are connected to the frame 10 by lower control arms 14. Each of the wheels 12 is rotatably mounted on a spindle 16 which is connected to an upper control arm 18 in addition to the lower control arm 14.

At the rear of the vehicle, road wheels 20 are connected at the outboard ends of an axle 22. A power receiving differential 24 is positioned midway in the axle 22 and distributes power or driving torque to the wheels 20.

The rear axle 22 is positioned by a pair of diagonally disposed lower control arms 26 and by a single upper control arm (not shown). The control arms 26 have a pivotal connection at 28 to the side rails of the frame 10; the rear end of the control arms 26 have a pivotal connection 30 to a bracket 32 carried by the axle 22.

Means are provided for resiliently supporting the body and chassis 10 upon the wheels 12 and 20. Such means include a pair of arcuate or bowed torsion bars 34 which extend the length of the vehicle. The bars 34 are designed to have a constant curvature radius throughout their length.

The torsion bars 34 have their ends diverging forwardly and outwardly. The forward end of the bars 34 are seated in a socket 36 carried by the lower front control arms 14. From the socket 36 the bars extend rearwardly and inwardly to a bracket 38 which connects the bars and joins them to the chassis 10. From their bracket connection at 38 the bars 34 extend rearwardly and again outwardly to a socket 40 carried by the rear control arms 26. The socket 40 is positioned adjacent to the pivot 28 connecting the arm 26 with the chassis 10. Thus, a resilient support is provided for the vehicle body by the torsion bars.

When one of the road wheels 12 strikes an object, the arm 14 will move in a vertical direction to impart a torque or torsional load into the torsion bars 34. Because the bar 34 is fabricated of spring metal this loading will be in a resilient fashion to absorb the shock encountered. The loading at the front end of the bar 34 will be transmitted to the control arm 26 and into the rear wheels 20. Thus a reaction occurs at the wheel opposite to the end where the road shock takes place. The bracket 38 merely positions the bars 34 and the same torque loading appears at the front socket 36 as appears at rear socket 40.

Similarly, when one of the rear wheels 20 strikes an obstacle, the arm 26 will swing upwardly about the pivot 28 imparting a torsional load through the socket 40, into the bar 34 and to the front wheel 12. This loading will be resisted in a resilient fashion as previously described.

In an interconnected torsion bar system such as this, means must be provided to stabilize the system. In the present case the stabilizing means include auxiliary torsion bars 42 which are connected to the rear control arms 26 near the pivot 28. The forward end of the auxiliary bars 42 are pivotally mounted upon the chassis 10 at the point 44. Load arms are connected to the bars 42 at the pivots 44 which in turn are connected to a load leveling device 46. In response to an appropriate sensing unit the leveling device 46 will be activated to increase or decrease the torque in the bars 42 in order to level the chassis 10 relative to the wheels 20. The operation of the auxiliary bars 42 and the leveling mechanism 46 is in a well-known and conventional fashion.

In review it is seen that the present invention provides a unique interconnected suspension system employing torsion bars which connect directly to the front and rear control arms without the employment of intermediate shackles or connecting devices.

The foregoing description presents the presently preferred embodiment of this invention. Modifications and alterations may occur to those skilled in the art which will come within the scope and spirit of the following claims.

I claim:

1. A motor vehicle having a chassis and front and rear wheels, lever means connecting said wheels to said chassis and adapted to permit said wheels to traverse jounce and rebound paths, spring means resiliently supporting said chassis on said wheels, said spring means including a pair of laterally spaced apart longitudinally extending torsion bars, said bars being of a generally sweeping arcuate shape, said bars having their front ends extending forwardly and outwardly and their rear ends extending rearwardly and outwardly, said bar ends being secured to said lever means.

2. A motor vehicle having a chassis and front and rear wheels, lever means connecting said wheels to said chassis and adapted to permit said wheels to traverse jounce and rebound paths, spring means resiliently supporting said chassis on said wheels, said spring means including a pair of laterally spaced apart longitudinally extending torsion bars, said bars being of a generally sweeping arcuate shape, said bars having their front ends extending forwardly and outwardly and their rear ends extending rearwardly and outwardly, said bar ends being secured to said lever means, said bars having juxtaposed midportions.

References Cited in the file of this patent
UNITED STATES PATENTS

| | | |
|---|---|---|
| 2,083,381 | Hutchison | June 8, 1937 |
| 2,850,290 | Borgmann | Sept. 2, 1958 |
| 2,859,976 | McFarland | Nov. 11, 1958 |
| 2,906,543 | Polhemus | Sept. 29, 1959 |